United States Patent
Wang et al.

(10) Patent No.: US 11,553,348 B2
(45) Date of Patent: Jan. 10, 2023

(54) AUTHORIZATION OF APPLICATIONS FOR DIRECT DISCOVERY

(71) Applicant: Nokia Technologies Oy, Espoo (FI)

(72) Inventors: Zhi Wang, Qingdao (CN); Yigang Cai, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 305 days.

(21) Appl. No.: 16/763,267

(22) PCT Filed: Nov. 15, 2017

(86) PCT No.: PCT/CN2017/111028
§ 371 (c)(1),
(2) Date: May 12, 2020

(87) PCT Pub. No.: WO2019/095128
PCT Pub. Date: May 23, 2019

(65) Prior Publication Data
US 2020/0336902 A1  Oct. 22, 2020

(51) Int. Cl.
*H04W 12/08* (2021.01)
*H04W 12/37* (2021.01)
(Continued)

(52) U.S. Cl.
CPC ........... *H04W 12/37* (2021.01); *H04W 4/023* (2013.01); *H04W 12/08* (2013.01);
(Continued)

(58) Field of Classification Search
CPC ..... H04W 12/37; H04W 76/14; H04W 12/63; H04W 12/122; H04W 12/30; H04W 4/023; H04W 12/08
See application file for complete search history.

(56) References Cited

U.S. PATENT DOCUMENTS 9,559,761 B2  1/2017  Luft et al.
9,654,967 B2  5/2017  Kim et al.
(Continued)

FOREIGN PATENT DOCUMENTS

CN  104066200 A  9/2014
CN  104244444 A  12/2014
(Continued)

OTHER PUBLICATIONS

Notice of Allowance received for corresponding Korean Patent Application No. 2020-7016653, dated Feb. 23, 2021, 2 pages of Notice of Allowance and 1 page of Translation available.
(Continued)

*Primary Examiner* — Khawar Iqbal
(74) *Attorney, Agent, or Firm* — Duft & Bornsen, PC

(57) ABSTRACT

Systems, methods, and software for authorizing an application in User Equipment (UE) for direct discovery. In one embodiment, an authorization mechanism receives information (e.g., application ID) for a discovery request sent by an application in a UE. In response to the discovery request, the authorization mechanism challenges the UE for information regarding security parameters that are mapped to the application ID. Based on the information provided by the UE, the authorization mechanism determines whether the application is authorized for direct discovery.

20 Claims, 8 Drawing Sheets

(51) Int. Cl.
*H04W 76/14* (2018.01)
*H04W 4/02* (2018.01)
*H04W 12/63* (2021.01)
*H04W 12/122* (2021.01)
*H04W 12/30* (2021.01)

(52) U.S. Cl.
CPC ......... *H04W 12/122* (2021.01); *H04W 12/30* (2021.01); *H04W 12/63* (2021.01); *H04W 76/14* (2018.02)

(56) References Cited

U.S. PATENT DOCUMENTS

| | | | |
|---|---|---|---|
| 9,942,838 B2* | 4/2018 | Kim | H04W 48/18 |
| 10,264,439 B2* | 4/2019 | Hakola | H04W 12/08 |
| 10,405,363 B2* | 9/2019 | Peng | H04W 8/005 |
| 10,484,396 B2* | 11/2019 | Peng | H04W 12/06 |
| 2015/0271675 A1 | 9/2015 | Cheng et al. | |
| 2016/0100305 A1 | 4/2016 | Karampatsis et al. | |
| 2016/0119963 A1 | 4/2016 | Casati | |
| 2016/0219437 A1 | 7/2016 | Suh | |
| 2016/0295347 A1* | 10/2016 | Ahmad | H04W 4/70 |
| 2016/0330619 A1 | 11/2016 | Suh | |
| 2017/0079076 A1 | 3/2017 | Enomoto et al. | |
| 2017/0105119 A1 | 4/2017 | Babbage et al. | |
| 2019/0230489 A1* | 7/2019 | Karampatsis | H04W 12/06 |
| 2020/0059767 A1* | 2/2020 | Woo | H04W 4/40 |
| 2020/0146051 A1* | 5/2020 | Agiwal | H04W 8/005 |
| 2020/0205063 A1* | 6/2020 | Enomoto | H04W 12/06 |
| 2020/0228543 A1* | 7/2020 | Zhang | H04L 63/126 |
| 2020/0336902 A1* | 10/2020 | Wang | H04W 4/023 |
| 2021/0067357 A1* | 3/2021 | Atarius | H04L 12/1432 |
| 2022/0029975 A1* | 1/2022 | Zhang | H04W 12/104 |
| 2022/0239512 A1* | 7/2022 | Atarius | H04M 15/66 |

FOREIGN PATENT DOCUMENTS

| | | |
|---|---|---|
| JP | 2017531952 A | 10/2017 |
| KR | 1020150042686 A | 4/2015 |
| KR | 1020170063931 A | 6/2017 |
| WO | 2011/015596 A1 | 2/2011 |
| WO | 2016/054526 A1 | 4/2016 |
| WO | 2016/054578 A1 | 4/2016 |
| WO | 2016/164493 A1 | 10/2016 |
| WO | 2016/167553 A1 | 10/2016 |

OTHER PUBLICATIONS

"3rd Generation Partnership Project; Technical Specification Group Services and System Aspects; Study on architecture enhancements to support Proximity-based Services (ProSe) (Release 12)", 3GPP TR 23.703 V12.0.0, Feb. 2014, pp. 1-324.

Extended European Search Report received for corresponding European Patent Application No. 17932011.4, dated May 31, 2021, 9 pages.

"3rd Generation Partnership Project; Technical Specification Group Core Network and Terminals; Proximity-services (ProSe) User Equipment (UE) to Prose function protocol aspects; Stage 3 (Release 15)", 3GPP TS 24.334 V15.0.0, Sep. 2017, pp. 1-263.

"3rd Generation Partnership Project; Technical Specification Group Services and System Aspects;Proximity-based services (ProSe); Stage 2 (Release 15)", 3GPP TS 23.303, V15.0.0, Jun. 2017, pp. 1-130.

Ahishakiye, "Neighbor Discovery and Resource Allocation for Device-to-device Communication", Research Paper, University of Agder, Jun. 2, 2014, 83 pages.

International Search Report and Written Opinion received for corresponding Patent Cooperation Treaty Application No. PCT/CN2017/111028, dated Jul. 27, 2018, 9 pages.

"D2D authorization on multiple PLMN scenario", 3GPP TSG-RAN3 Meeting #84, R3-141220, Agenda : 18.4, ZTE, May 19-23, 2014, pp. 1-2.

Office action received for corresponding Japanese Patent Application No. 2020-545404, dated Jul. 6, 2021, 3 pages of office action and 2 pages of Translation available.

"Proposal for Modification of the ProSe Function", SA WG2 Meeting #101bis, S2-140683, Agenda : 6.2.1, Motorola Solutions, Feb. 17-21, 2014, 3 pages.

* cited by examiner

FIG. 8 ⟵720

```
┌─────────────────────────────────────────────────┐
│                  RECORD 801                      │
│  ┌──────────┐  ┌─────────────────────────────┐  │
│  │APP ID 811│  │        UE IDENTITY          │  │
│  └──────────┘  ├─────────────────────────────┤  │
│                │      NETWORK ADDRESS(ES)    │  │
│         820─   ├─────────────────────────────┤  │
│                │        PLMN CODE(S)         │  │
│         820─   ├─────────────────────────────┤  │
│                │       LOCATION CODE(S)      │  │
│         820─   ├─────────────────────────────┤  │
│                │         PASSCODE(S)         │  │
│                ├─────────────────────────────┤  │
│                │      UE CATEGORY TYPE       │  │
│                ├─────────────────────────────┤  │
│                │       DISCOVERY TYPE        │  │
│                └─────────────────────────────┘  │
│                           ...                   │
└─────────────────────────────────────────────────┘

┌─────────────────────────────────────────────────┐
│                  RECORD 802                      │
│  ┌──────────┐  ┌─────────────────────────────┐  │
│  │APP ID 812│  │        UE IDENTITY          │  │
│  └──────────┘  ├─────────────────────────────┤  │
│                │      NETWORK ADDRESS(ES)    │  │
│         820─   ├─────────────────────────────┤  │
│                │        PLMN CODE(S)         │  │
│         820─   ├─────────────────────────────┤  │
│                │       LOCATION CODE(S)      │  │
│         820─   ├─────────────────────────────┤  │
│                │         PASSCODE(S)         │  │
│                ├─────────────────────────────┤  │
│                │      UE CATEGORY TYPE       │  │
│                ├─────────────────────────────┤  │
│                │       DISCOVERY TYPE        │  │
│                └─────────────────────────────┘  │
│                           ...                   │
└─────────────────────────────────────────────────┘

┌─────────────────────────────────────────────────┐
│                  RECORD 803                      │
│  ┌──────────┐  ┌─────────────────────────────┐  │
│  │APP ID 813│  │        UE IDENTITY          │  │
│  └──────────┘  ├─────────────────────────────┤  │
│                │      NETWORK ADDRESS(ES)    │  │
│         820─   ├─────────────────────────────┤  │
│                │        PLMN CODE(S)         │  │
│         820─   ├─────────────────────────────┤  │
│                │       LOCATION CODE(S)      │  │
│         820─   ├─────────────────────────────┤  │
│                │         PASSCODE(S)         │  │
│                ├─────────────────────────────┤  │
│                │      UE CATEGORY TYPE       │  │
│                ├─────────────────────────────┤  │
│                │       DISCOVERY TYPE        │  │
│                └─────────────────────────────┘  │
│                           ...                   │
└─────────────────────────────────────────────────┘

⋮
```

AUTHORIZATION OF APPLICATIONS FOR DIRECT DISCOVERY

RELATED APPLICATION

This application claims priority to PCT Application No. PCT/CN2017/111028, filed on Nov. 15, 2017, of which is incorporated herein by reference in its entirety.

FIELD OF THE INVENTION

The invention is related to the field of communication systems and, in particular, to direct discovery for proximity services.

BACKGROUND

Mobile communications have primarily involved a mobile station (i.e., User Equipment (UE)) communicating with a base station that is in turn connected to a core network. The control and user plane traffic was routed through the core network. Proximity services or proximity-based services refer to services provided between UEs being in proximity to each other. Proximity services utilize the radio technologies of the UEs so that the UEs in close proximity can exchange communications directly with one another without going through the core network, which is also referred to as device-to-device (D2D) communications.

The Third Generation Partnership Program (3GPP) has defined Proximity Services (ProSe), which allows for D2D communications as an underlay to a cellular network. In D2D communications, UEs transmit data signals to each other over a direct link using the cellular resources instead of routing the data signals through the core network. Therefore, D2D communications involve directly transmitting traffic between UEs that are in the vicinity of one another instead of routing the traffic over a core network, such as the Evolved Packet Core (EPC). Because there is direct communication between UEs that are in close proximity, D2D communications offload traffic from the EPC network without additional infrastructure. D2D communications may also offer higher data rates, lower transfer delays, and better power efficiency within a UE.

Proximity services generally include discovery, direct communication, and UE-to-network relay. Discovery is a procedure that identifies UEs that are in proximity with each other. Direct communication is a procedure where UEs in proximity are able to communicate using local radio resources. UE-to-network relay is a procedure where a UE can relay traffic from a remote UE to the network, or from the network to the remote UE. For example, if a UE (referred to as a remote UE) is outside of the coverage area of the base stations for a network, then the UE-to-network relay procedure allows the remote UE to transmit traffic to a relay UE that is in the coverage area of a base station through a direct communication with the relay UE. The relay UE in turn forwards the traffic from the remote UE to the network by communicating with a base station of the network.

The 3GPP has defined some procedures for authorizing a UE during a discovery procedure. However, present authorization procedures may be insufficient to detect malicious applications that attempt to use proximity services.

SUMMARY

Embodiments described herein provide mechanisms for authorizing an application on a UE that is requesting direct discovery. When an application on a UE sends a discovery request for ProSe, an authorization mechanism as described herein provides enhanced discovery authorization procedures to ensure that the application is authorized for direct discovery. Applications for proximity services are distinguished by Application Identifiers (ID), and a network operator may define one or more security parameters for the Application IDs. The authorization mechanism described herein sends a challenge message to the UE requesting information related to the security parameters for the Application ID provided in the discovery request, and is able to determine whether the application is authorized for direct discovery using the Application ID based on the answer to the challenge message provided by the UE. The discovery authorization procedures described herein are advantageously able to determine when a malicious application is spoofing an Application ID so that discovery requests from this malicious application may be rejected.

One embodiment comprises an authorization mechanism that performs a discovery authorization procedure for ProSe. The authorization mechanism includes a validation controller configured to receive information for a discovery request sent by an application in a UE. The discovery request includes an Application ID for the application. The authorization mechanism further includes a rules engine configured to determine validation rules for the discovery authorization procedure. The validation controller is configured to send a security challenge message to the UE requesting challenge values for security parameters that are mapped to the Application ID, to receive a security answer message from the UE in response to the security challenge message, to extract the challenge values for the security parameters from the security answer message as provided by the UE, and to determine whether the application is authorized for direct discovery using the Application ID based on the challenge values for the security parameters and the validation rules. The validation controller is configured to generate a validation indicator to authorize the discovery request sent by the application when the application is authorized for direct discovery using the Application ID.

In another embodiment, the validation controller is configured to generate a rejection indicator to reject the discovery request sent by the application when the application is not authorized for direct discovery using the Application ID.

In another embodiment, the authorization mechanism further includes a database that maps the security parameters to the Application ID. The security parameters mapped to the Application ID include authorized values provisioned for the Application ID.

In another embodiment, the validation controller is configured to identify the authorized values for the security parameters mapped to the Application ID, and to compare the challenge values provided by the UE to the authorized values provisioned for the Application ID to determine whether the application is authorized for direct discovery using the Application ID.

In another embodiment, the validation controller is configured to send the security challenge message to the UE requesting a network address assigned to the UE.

In another embodiment, the validation controller is configured to send the security challenge message to the UE requesting a Public Land Mobile Network (PLMN) code.

In another embodiment, the validation controller is configured to send the security challenge message to the UE requesting a location code for the UE.

In another embodiment, the validation controller is configured to send the security challenge message to the UE requesting a passcode used to access the application.

In another embodiment, the authorization mechanism is implemented in a ProSe function that receives the discovery request from the UE.

In another embodiment, the authorization mechanism is implemented in a ProSe Application Server that is communicatively coupled to a ProSe function that receives the discovery request from the UE.

Another embodiment comprises a method of performing a discovery authorization procedure for ProSe. The method comprises receiving information for a discovery request sent by an application in a UE, where the discovery request includes an Application ID for the application. The method comprises determining validation rules for the discovery authorization procedure, sending a security challenge message from the authorization mechanism to the UE requesting challenge values for security parameters that are mapped to the Application ID, receiving a security answer message from the UE in response to the security challenge message, extracting the challenge values for the security parameters from the security answer message as provided by the UE, and determining whether the application is authorized for direct discovery using the Application ID based on the challenge values for the security parameters and the validation rules. The method comprises generating a validation indicator to authorize the discovery request sent by the application when the application is authorized for direct discovery using the Application ID.

In another embodiment, the method further comprises generating a rejection indicator to reject the discovery request sent by the application when the application is not authorized for direct discovery using the Application ID.

In another embodiment, the method comprises storing a database that maps the security parameters to the Application ID. The security parameters mapped to the Application ID include authorized values provisioned for the Application ID.

In another embodiment, the step of determining whether the application is authorized for direct discovery comprises identifying the authorized values for the security parameters mapped to the Application ID, and comparing the challenge values provided by the UE to the authorized values provisioned for the Application ID to determine whether the application is authorized for direct discovery using the Application ID.

Another embodiment comprises a non-transitory computer readable medium embodying programmed instructions executed by one or more processors, wherein the instructions direct the processors to implement an authorization mechanism that performs a discovery authorization procedure for ProSe. The authorization mechanism is configured to receive information for a discovery request sent by an application in a UE, where the discovery request includes an Application ID for the application. The authorization mechanism is configured to determine validation rules for the discovery authorization procedure, to send a security challenge message to the UE requesting challenge values for security parameters that are mapped to the Application ID, to receive a security answer message from the UE in response to the security challenge message, to extract the challenge values for the security parameters from the security answer message as provided by the UE, and to determine whether the application is authorized for direct discovery using the Application ID based on the challenge values for the security parameters and the validation rules. The authorization mechanism is configured to generate a validation indicator to authorize the discovery request sent by the application when the application is authorized for direct discovery using the Application ID.

In another embodiment, the authorization mechanism is configured to generate a rejection indicator to reject the discovery request sent by the application when the application is not authorized for direct discovery using the Application ID.

In another embodiment, the authorization mechanism is configured to store a database that maps the security parameters to the Application ID. The security parameters mapped to the Application ID include authorized values provisioned for the Application ID.

In another embodiment, the authorization mechanism is configured to identify the authorized values for the security parameters mapped to the Application ID, and to compare the challenge values provided by the UE to the authorized values provisioned for the Application ID to determine whether the application is authorized for direct discovery using the Application ID.

In another embodiment, the authorization mechanism is implemented in a ProSe function that receives the discovery request from the UE.

In another embodiment, the authorization mechanism is implemented in a ProSe Application Server that is communicatively coupled to a ProSe function that receives the discovery request from the UE.

Another embodiment comprises an authorization mechanism that performs a discovery authorization procedure for ProSe. The authorization mechanism includes a means for receiving information for a discovery request sent by an application in a UE, where the discovery request includes an Application ID for the application. The authorization mechanism includes a means for determining validation rules for the discovery authorization procedure. The authorization mechanism includes a means for sending a security challenge message to the UE requesting challenge values for security parameters that are mapped to the Application ID. The authorization mechanism includes a means for receiving a security answer message from the UE in response to the security challenge message. The authorization mechanism includes a means for extracting the challenge values for the security parameters from the security answer message as provided by the UE. The authorization mechanism includes a means for determining whether the application is authorized for direct discovery using the Application ID based on the challenge values for the security parameters and the validation rules. The authorization mechanism includes a means for generating a validation indicator to authorize the discovery request sent by the application when the application is authorized for direct discovery using the Application ID.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

FIG. 8 illustrates a database in an illustrative embodiment.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
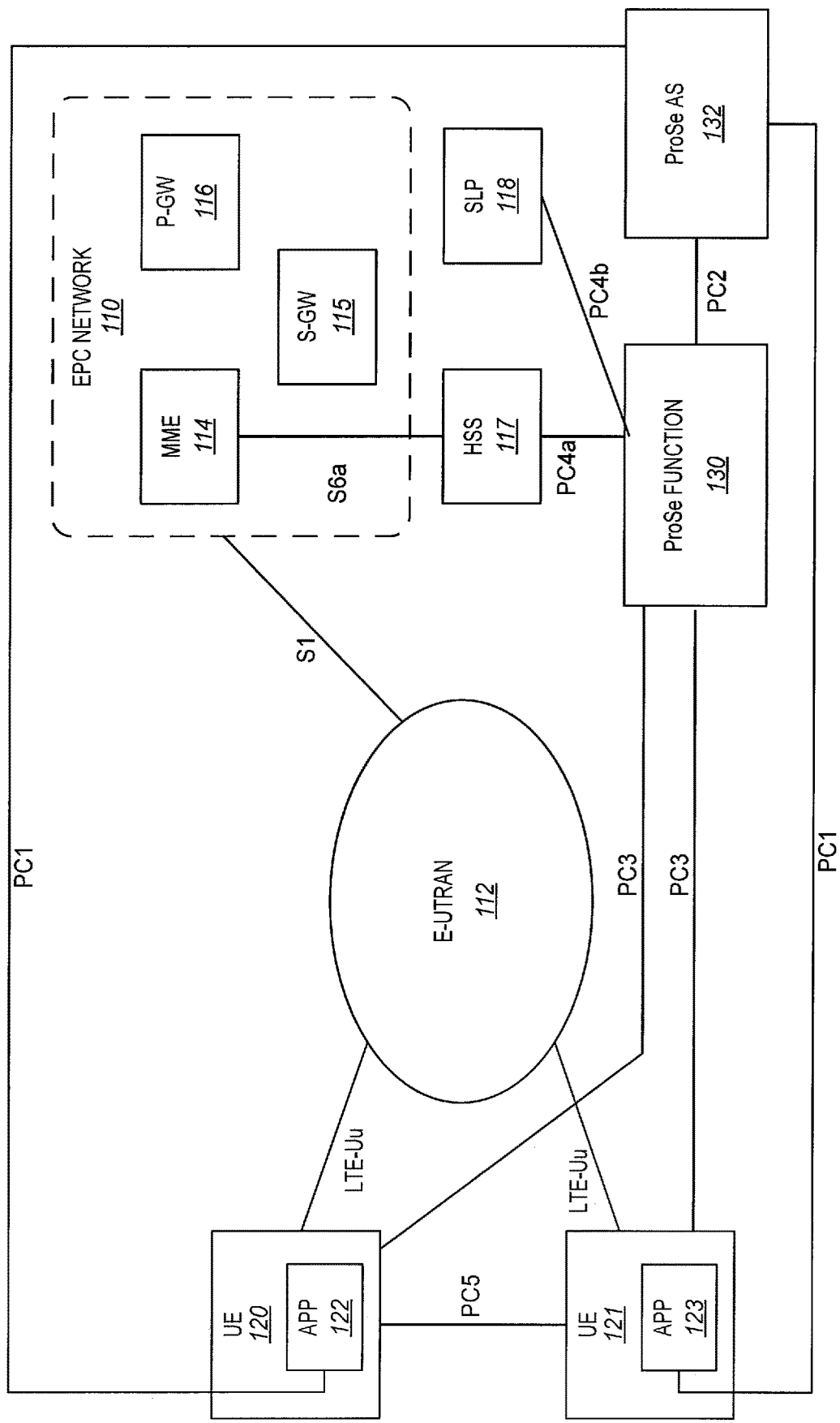
FIG. 1 illustrates an architecture for ProSe features.

FIG. 1 illustrates an architecture 100 for ProSe features. Architecture 100 illustrates a non-roaming scenario in a Public Land Mobile Network (PLMN) as described in 3GPP TS 23.303 (version 15.0.0), which is incorporated by reference as if fully included herein. Architecture 100 includes an Evolved Packet Core (EPC) network 110 that communicates with UEs 120-121 over a Radio Access Network (RAN), which is illustrated as an Evolved-UMTS Terrestrial Radio Access Network (E-UTRAN) 112. Although not shown in FIG. 1, E-UTRAN 112 includes a plurality of base stations (e.g., eNodeB) that provide wireless connections between. UEs 120-121 (and other UEs) and EPC network 110. EPC network 110 includes a Mobility Management Entity (MME) 114, an S-GW 115, and a P-GW 116. Architecture 100 also includes a Home Subscriber Server (HSS) 117 and a Secure User Plane Location Platform (SLP) 118. HSS 117 stores subscription information for UEs 120-121 in the form of subscriber profiles. SLP 118 maintains location information for UEs 120-121.

Architecture 100 further includes a Proximity Service (ProSe) function 130 and a ProSe Application Server (AS) 132. ProSe Application Server 132 supports storage of EPC ProSe User IDs and ProSe function IDs, and mapping of Application Layer User IDs and EPC ProSe User IDs. ProSe function 130 is a logical function that is used for network-related actions required for ProSe. ProSe function 130 plays different roles for each of the features of ProSe. There may be one ProSe function 130 in each PLMN that supports proximity services. ProSe function 130 includes three main sub-functions that perform different roles depending on the ProSe feature. One sub-function is a Direct Provisioning Function (DPF) that is used to provision a UE with parameters in order use direct discovery and direct communication. The DPF provisions the UEs with PLMN-specific parameters that allow the UEs to use proximity services in this specific PLMN. Another sub-function is a Direct Discovery Name Management Function, which is used for open direct discovery to allocate and process Applications IDs and Application Codes used in direct discovery. This sub-function maintains a table that lists the mapping between the Application ID and Application Code. In addition, this sub-function generates filters for monitoring UEs. Another sub-function is an EPC-level discovery ProSe function, which authorizes and configures UEs for EPC-level ProSe discovery and EPC-assisted WLAN direct discovery and communication. The reference point (PC4a) between HSS 117 and ProSe function 130 is used to provide subscription information in order to authorize access for direct discovery and direct communication on a per-PLMN basis.

UEs 120-121 may be considered as ProSe-enabled, meaning that they support ProSe requirements and associated procedures. A ProSe-enabled UE may refer to a non-Public Safety UE or a Public Safety UE. UEs 120-121 include an application 122-123, respectively, that is used to access/provide proximity services. UEs 120-121 support the following functions: exchange of ProSe control information between the UE and ProSe function 130 over the PC3 reference point, procedures for open and restricted direct discovery of other UEs over the PC5 reference point, procedures for one-to-one or one-to-many direct communication over the PC5 reference point, and procedures to act as a UE-to-network relay.

Proximity services as discussed herein include the following functions: discovery, direct communication (D2D), and UE-to-network relay. Discovery is a process that identifies a UE in proximity of other UEs. One type of discovery is direct discovery, which is a process employed by a UE to discover other UEs in its vicinity by using only the capabilities of the two UEs. For example, one UE may use local radio resources to discover the presence of other UEs in its vicinity. Another type of discovery is referred to as EPC-level discovery, which is a process by which EPC network 110 determines the proximity of two UEs and informs them of their proximity. For example, a server in EPC network 110 may monitor the location of UEs, and inform the UEs of their proximity.

Direct communication is a communication between two or more UEs in proximity by means of user data plane transmissions using radio technology (e.g., E-UTRA) via a channel not traversing any network node (other than possibly a base station of a RAN). Direct communication allows the UEs to use local radio resources to communicate directly with each other without routing traffic through a core network, such as EPC network 110. For example, UEs may directly communicate through the radio resources available to both UEs from a RAN, such as from a base station. UEs may also directly communicate through the radio resources of the UEs themselves, such as over the PC5 reference point. Either way, the traffic exchanged between the UEs is not routed through the core network, but is routed directly between the UEs over a wireless interface.

UE-to-network relay is a function where one UE provides functionality to support connectivity to "unicast" services for one or more remote UEs. A remote UE refers to a UE that is not served by a RAN (e.g., E-UTRAN), and communicates with a Packet Data Network (PDN) through a UE-to-network relay. For instance, if a remote UE is out-of-coverage of a RAN, then the remote UE may still access the PDN through another UE (relay UE) that is in-coverage of the RAN. A relay UE is a device that is enabled for UE-to-network relay. UE-to-network relay allows for one-to-one or one-to-many communications from the network to a remote UE via a relay UE which is in-coverage, or from a remote UE to the network via a relay UE that is in-coverage.

Figure 2:
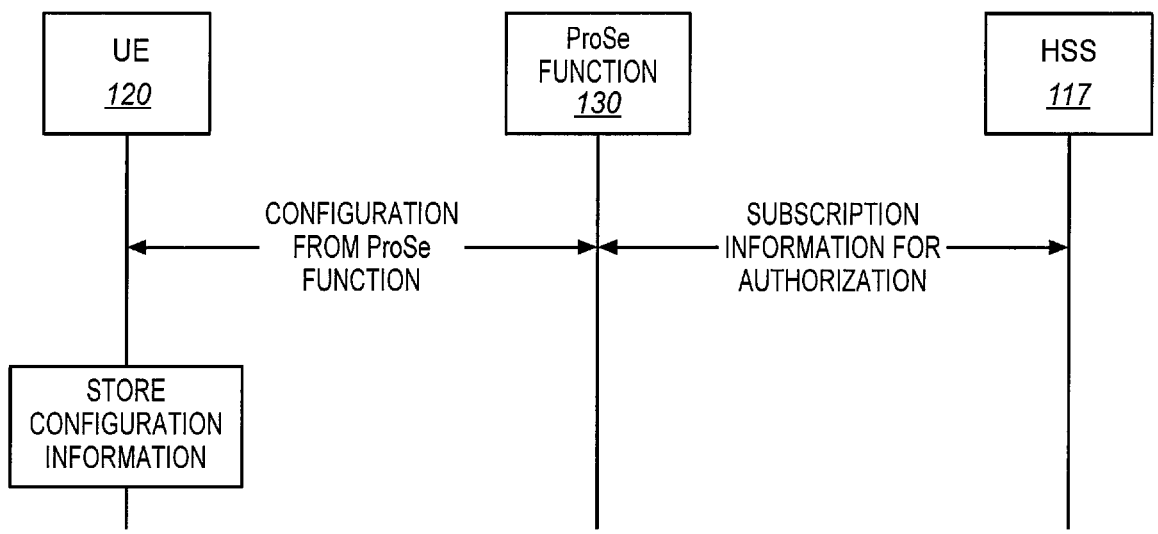
FIG. 2 illustrates a service pre-configuration procedure for a UE.

FIG. 2 illustrates a service pre-configuration procedure for a UE 120. The Home PLMN (HPLMN) pre-configures UE 120 with the authorization information for a list of PLMNs where UE 120 is authorized to perform direct discovery, direct communication, or both. If there is no associated UE context, ProSe function 130 obtains the subscription information for direct discovery and/or direct communication from HSS 117.

Figure 3:
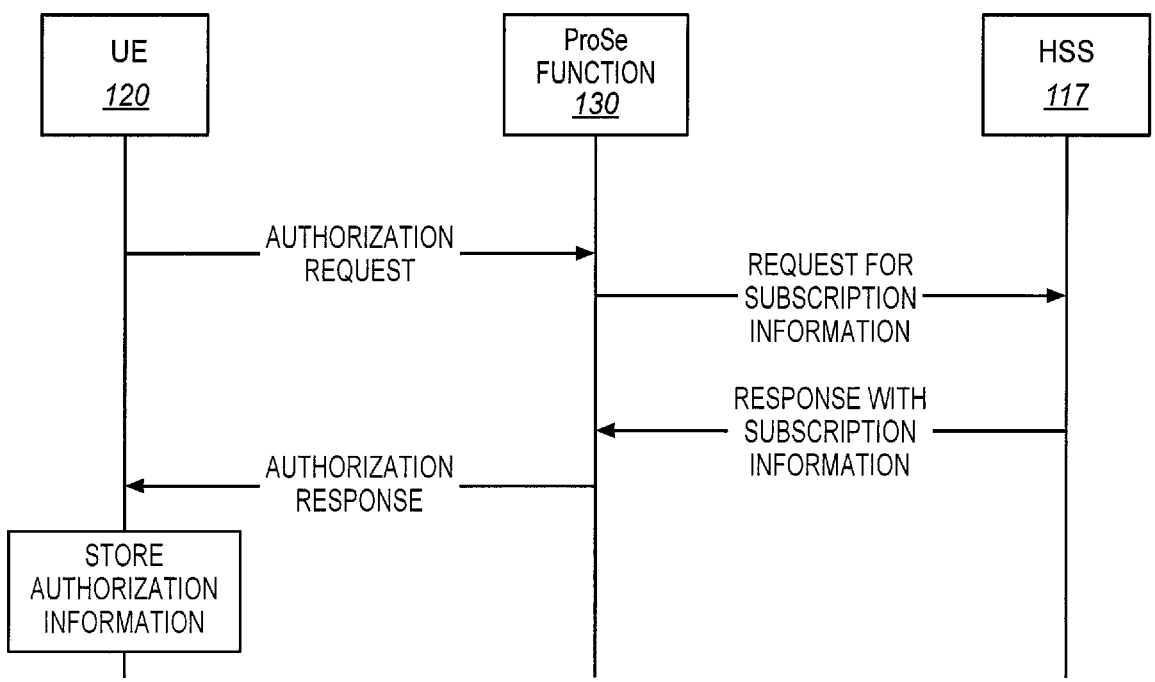
FIG. 3 illustrates a service authorization procedure for a UE.

In order to access a proximity service, a UE 120-121 (i.e., a non-public safety UE) has to first be authorized and configured for the service. FIG. 3 illustrates a service authorization procedure for UE 120. UE 120 receives service authorization for direct discovery, direct communication, or both with a given validity time from ProSe function 130 of its HPLMN. UE 120 performs this service authorization procedure before starting the setup of direct discovery or direct communication if UE 120 has no valid authorization information, when a UE is already engaged in a direct discovery or direct communication but changes its registered PLMN, or when a prior authorization expires. To identify ProSe function 130 of its HPLMN, UE 120 may interact with a Domain Name Service (DNS) function (not shown) to discover ProSe function 130, or information for ProSe function 130 may be pre-provisioned in UE 120. UE 120 transmits an authorization request for direct discovery, direct communication, or both to ProSe function 130 in its HPLMN. In response to the authorization request, ProSe function 130 transmits a request for subscription information (e.g., a subscriber profile) associated with UE 120 to HSS 117, assuming that ProSe function 130 does not already have this information for UE 120. HSS 117 identifies subscription information for UE 120 that is related to proximity services (e.g., direct discovery and/or direct communication), and transmits a response to ProSe function 130 with the subscription information. ProSe function 130 then sends an authorization response to UE 120 with authorization information for a proximity service, which is stored by UE 120. UE 120 may perform direct discovery and/or direct communications using a PLMN that is authorized by ProSe function 130.

After authorization and provisioning, UEs 120-121 may send a discovery request to EPC network 110, which is processed by ProSe function 130. Two types of discovery are defined for direct discovery: open and restricted. In open discovery, no explicit permission is needed from a UE being discovered. In restricted discovery, explicit permission is needed from a UE being discovered. The 3GPP has also defined two possible direct discovery modes: Model A and Model B. Model A ("I am here"), defines two roles for UEs that are participating in direct discovery. One role is an announcing UE, which announces certain information that could be used by UEs in proximity that have permission to discover. The other role is a monitoring UE, which monitors certain information of interest in proximity of announcing UEs. In this model, the announcing UE broadcasts discovery messages at pre-defined discovery intervals, and the monitoring UEs that are interested in these messages read them and process them.

Model B ("Who is there?"/"Are you there?") is used when restricted discovery type is used, and defines two roles for UEs that are participating in direct discovery. One role is a discoverer UE, which transmits a request containing certain information about what it is interested to discover. The other role is a discoveree UE, which can respond with some information related to the discoverer's request.

Figure 4:
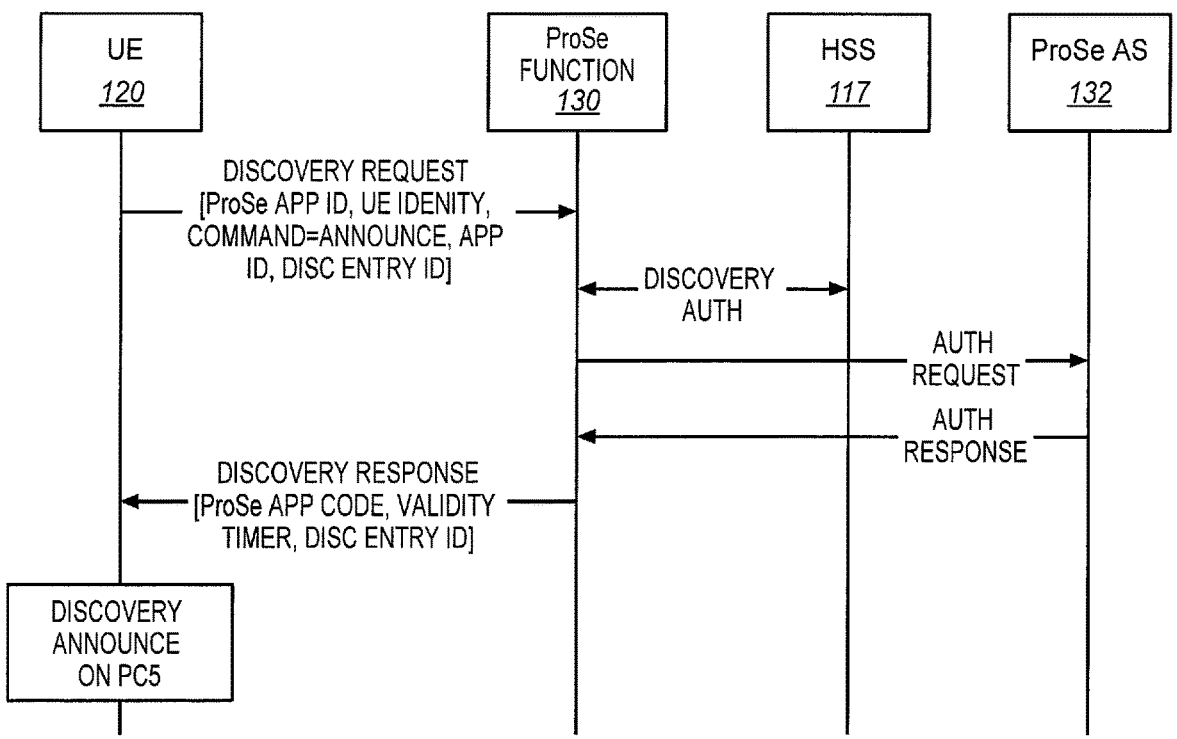
FIG. 4 illustrates a discovery request procedure for an announcing UE.

FIG. 4 illustrates a discovery request procedure for an announcing UE 120 (non-roaming, open discovery). UE 120 is configured with a data structure of the Application IDs corresponding to its HPLMN. If UE 120 is authorized to announce in its HPLMN, then UE 120 sends a discovery request to ProSe function 130. The discovery request includes a ProSe Application ID, UE Identity, announce command, Application ID, Discovery Entry ID, [Requested Timer], [Application Level Container], and [PC5_tech]. The ProSe Application ID indicates what the UE is interested to announce. The UE Identity is set to its International Mobile Subscriber Identity (IMSI). The Application ID represents a unique identifier of the UE application that has triggered the transmission of the discovery request. The Discovery Entry ID indicates whether this is a new request. The Requested Timer is an optional parameter, and indicates the length of validity timer associated with the ProSe Application Code that the UE expects to receive from ProSe function 130. PC5_tech is an optional parameter that indicates the PC5 radio technology (e.g., E-UTRA, WLAN) that UE 120 wishes to use for announcements. ProSe function 130 checks for the authorization of the application represented by the Application ID. If there is no associated UE context, then ProSe function 130 checks with HSS 117 regarding the authorization of UE 120 for discovery, and creates a new context for UE 120 that contains the subscription parameters for UE 120.

If UE 120 indicated that it desired application-controlled extension by the inclusion of the Application Level Container, then ProSe function 130 sends an Authorization Request (ProSe Application ID, Request Type, Application Level Container, Allowed number of suffixes) to ProSe Application Server 132. The Request Type is set to "open discovery with application-controlled extension/announce". The Allowed Number of Suffixes indicates how many ProSe Restricted Code Suffixes the ProSe Application Server 132 can assign for UE 120. ProSe function 130 locates the ProSe Application Server 132 based on the Application ID. ProSe Application Server 132 returns an Authorization Response (Response Type, ProSe Application Code Suffix pool) to ProSe function 130 with the Response Type set to "open discovery with application-controlled extension/announce ack". The ProSe Application Code Suffix pool contains the Suffix(es) allocated by ProSe Application Server 132.

If the discovery request is authorized, then ProSe function 130 checks whether UE 120 is authorized to use the ProSe Application ID (e.g., UE 120 is authorized to announce) contained in the discovery request. If UE 120 is authorized to use the ProSe Application ID, then ProSe function 130 responds to UE 120 with a discovery response. The discovery response includes a ProSe Application Code, validity timer, Discovery Entry ID, and [PC5_tech]. The ProSe Application Code is provided by ProSe function 130, and corresponds to the ProSe Application ID that was contained in the discovery request (i.e., is composed from a PLMN ID and a temporary ID for the Application ID). The validity timer indicates for how long this ProSe Application Code is valid. ProSe function 130 takes into account the Requested Timer parameter, if provided by UE 120, when allocating the validity timer. UE 120 will be authorized to announce this ProSe Application Code for the duration of the validity timer and if it remains in the HPLMN. When the validity timer expires or UE 120 changes its registered PLMN, UE 120 requests a new ProSe Application Code. The optional PC5_tech parameter indicates the PC5 radio technology(ies) that is/are authorized to be used for the assigned ProSe Application Code. After UE 120 receives the discovery response, it is configured to announce on PC5 using a discovery message and the ProSe Application Code.

Figure 5:
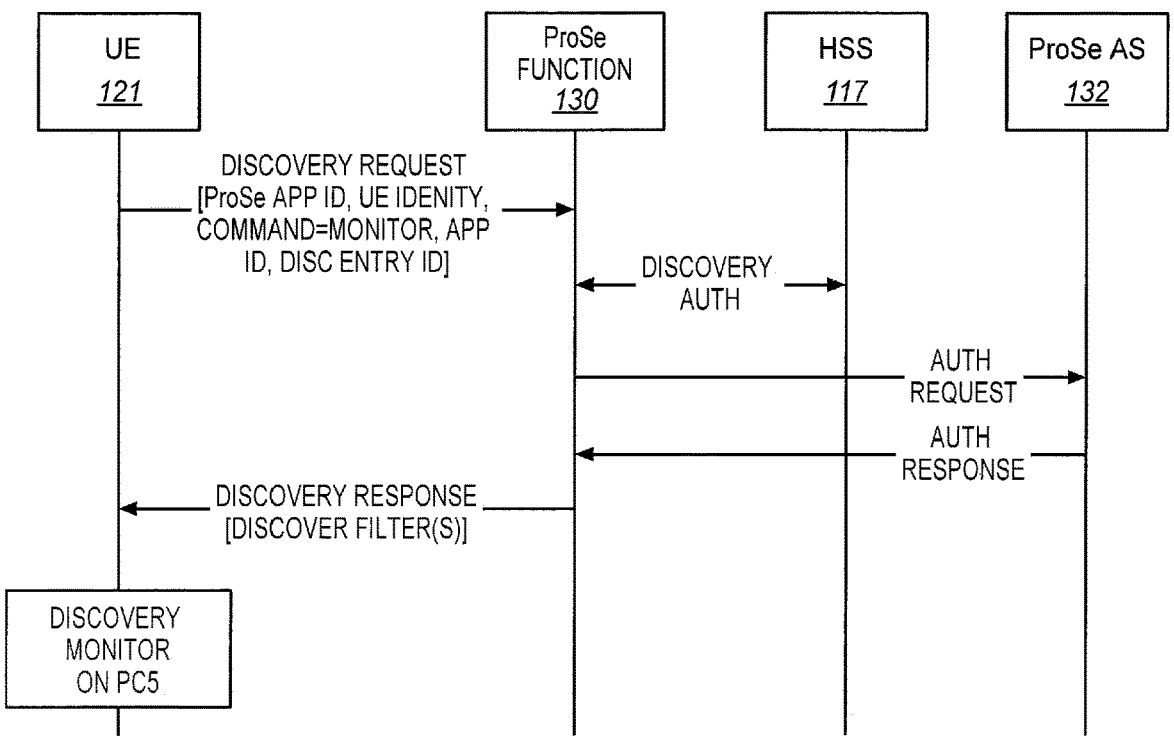
FIG. 5 illustrates a discovery request procedure for a monitoring UE.

FIG. 5 illustrates a discovery request procedure for a monitoring UE 121 (non-roaming, open discovery). UE 121 is configured with a data structure of the ProSe Application IDs corresponding to its PLMNs. If UE 121 is authorized to monitor in at least one PLMN, then UE 121 sends a discovery request to ProSe function 130. The discovery request from a monitoring UE may include similar information as described above, except the command is set to "Monitor". The ProSe Application ID(s) indicate what UE 121 is interested in monitoring, and they consist of a subset of the data structure of the PLMN. The Application ID represents a unique identifier of the application that has triggered the transmission of the discovery request message. ProSe function 130 checks for the authorization of the application represented by the Application ID. If there is no associated UE context, then ProSe function 130 checks with HSS 117 regarding the authorization of UE 121 for discovery, and creates a new context for UE 121 that contains the subscription parameters for UE 120.

If UE 121 indicated that it desired application-controlled extension by the inclusion of the Application Level Container, then ProSe function 130 sends an Authorization Request (ProSe Application ID, Request Type, Application Level Container) to ProSe Application Server 132 indicated by the Application ID. The Request Type is set to "open discovery with application-controlled extension/monitor". ProSe Application Server 132 returns an Authorization Response (Response Type, mask(s) for the ProSe Application Code Suffix(es) corresponding to ProSe Application ID) to ProSe function 130 with the Response Type set to "open discovery with application-controlled extension/monitor ack".

If the discovery request is authorised, then ProSe function 130 responds to UE 121 with a discovery response. The discovery response includes a Discovery Filter(s), Discovery Entry ID, and [PC5_tech]. The Time to Live (TTL(s)) in the Discovery Filter(s) indicate how long the Discovery Filter(s) are valid. If application-controlled extension is used, the ProSe Application Code in the Discovery Filter is replaced by the ProSe Application Code Prefix. Besides the ProSe Application Code(s), the Discovery Filter may also contain the mask(s) for the ProSe Application Code Suffix, which is/are obtained from ProSe Application Server 132. UE 121 may add additional mask(s) and values for the Suffix part. After UE 121 receives the discovery response, it is configured to monitor on PC5 for Application Codes using the Discovery Filter(s) in the radio resources that are authorized and configured by the PLMN(s) to be used for ProSe. If the TTL corresponding to a Discovery Filter expires (because UE 121 has not refreshed the corresponding discovery request within the duration of the TTL), then ProSe function 130 removes the entry related to that Discovery Filter from the UE context.

Other discovery procedures, such as for restricted discovery, roaming, Model B, etc., are described in 3GPP TS 23.303.

As is evident in the above discovery procedures, ProSe function 130 performs some type of authorization of a UE by querying HSS 117. HSS 117 responds with subscription parameters for the UE, and ProSe function 130 determines whether this application is authorized for discovery. However, one problem is that a UE or other device can spoof an Application ID in a discovery request. The subscriber profile in HSS 117 may not indicate all ProSe applications residing in a UE that are authorized for ProSe. Thus, even if a UE is authorized for ProSe according to the subscriber profile, one or more applications may be maliciously used by this UE. The authorization procedure using HSS 117 is insufficient to protect against spoofed Application IDs.

Figure 6:
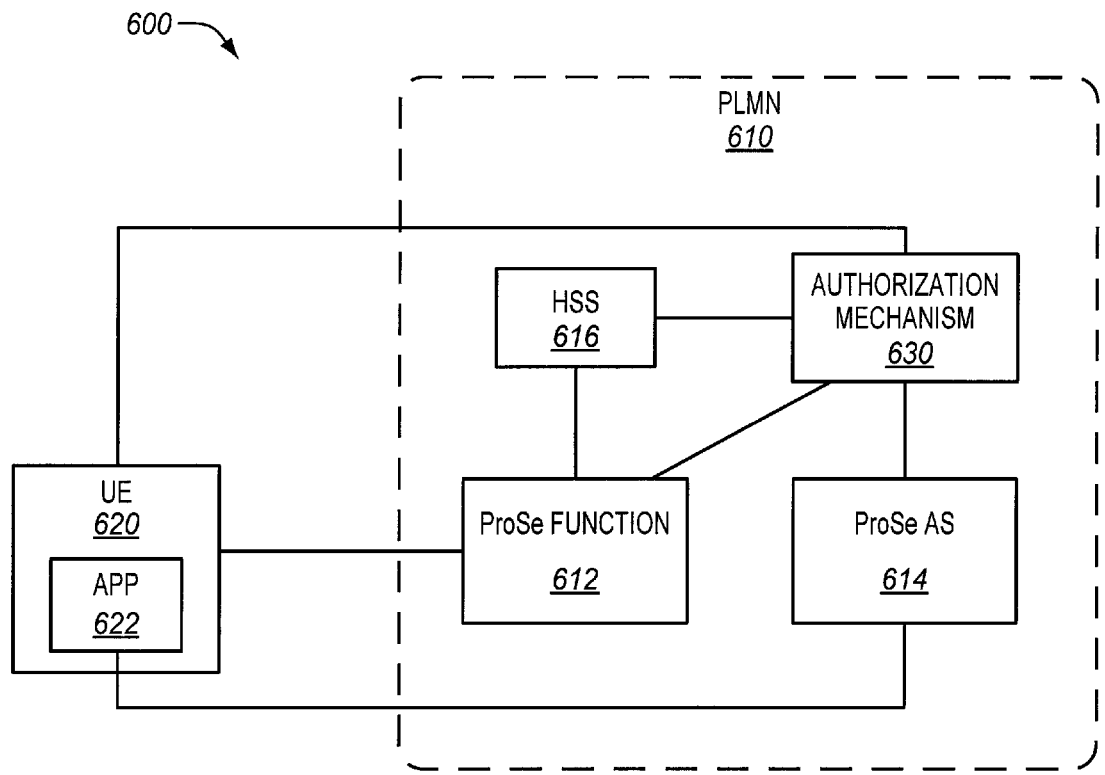
FIG. 6 illustrates an architecture for proximity services in an illustrative embodiment.

To solve this and other related issues, an authorization mechanism is employed to detect spoofed Application IDs for proximity services, such as ProSe. When the term "ProSe" is used herein, it may refer to proximity service as described by the 3GPP or other proximity services. FIG. 6 illustrates an architecture 600 for proximity services in an illustrative embodiment. Architecture 600 may have similar elements and reference points as architecture 100 shown in FIG. 1. Architecture 600 may be implemented for 4G (e.g., LTE) or next-generation networks (e.g., 5G).

Architecture 600 includes a PLMN 610 for a non-roaming scenario, although more PLMNs may be included for roaming or inter-PLMN architectures. PLMN 610 is the home PLMN (HPLMN) of a UE 620, and includes a ProSe function 612, a ProSe Application Server (AS) 614, and an HSS 616 that are communicatively coupled to one another. Although not shown in FIG. 6, PLMN 610 may include a core network, and a RAN that includes one or more base stations (e.g., eNodeB). UE 620 is a non-public safety UE enabled for proximity services, and includes a proximity service (e.g., ProSe) application 622 that is configured to request direct discovery and/or direct communication.

PLMN 610 also includes an authorization mechanism 630. Authorization mechanism 630 comprises a system, apparatus, device, network element, etc., that is configured to authorize an application on a UE for direct discovery. Authorization mechanism 630 provides enhanced or additional discovery authorization procedures in response to a discovery request to ensure that the application, which initiated the discovery request, is authorized for direct discovery. As described above, a traditional ProSe function performs some discovery authorization procedures in response to a discovery request by querying an HSS. However, these discovery authorization procedures may not be sufficient when an application maliciously spoofs an Application ID for an application. Thus, authorization mechanism 630 provides enhanced or additional discovery authorization procedures by challenging a UE, which is described in further detail below.

Authorization mechanism 630 is shown generally in FIG. 6 as an element of PLMN 610. As authorization mechanism 630 is part of a system within PLMN 610, it may be a stand-alone element in PLMN 610 that is able to communicate with UE 620, ProSe function 612, ProSe Application Server 614, and/or HSS 616. Alternatively, authorization mechanism 630 may be implemented in ProSe function 612. In another alternative, authorization mechanism 630 may be implemented in ProSe Application Server 614.

Figure 7:
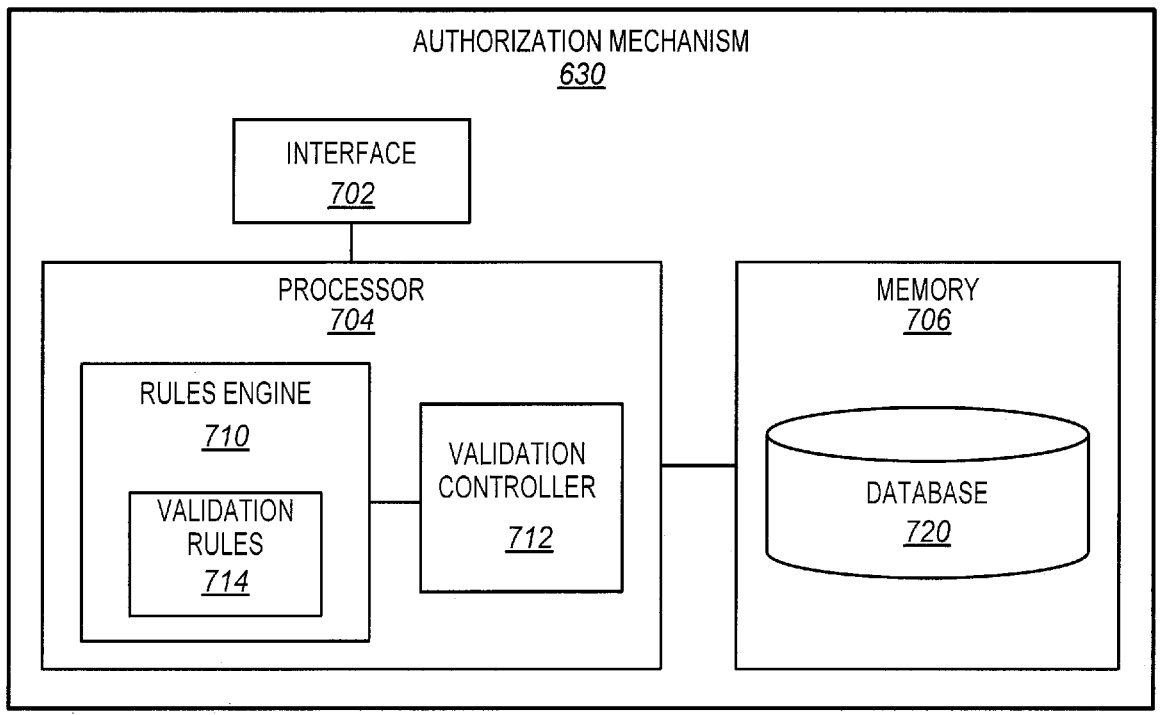
FIG. 7 is a block diagram of an authorization mechanism in an illustrative embodiment.

FIG. 7 is a block diagram of an authorization mechanism 630 in an illustrative embodiment. Authorization mechanism 630 includes an interface component 702, one or more processors 704, and a memory 706. Interface component 702 is a hardware component configured to communicate with a variety of elements. For example, interface component 702 may be configured to communicate with UE 620, ProSe function 612, ProSe Application Server 614, and/or HSS 616. Processor 704 represents the internal circuitry, logic, hardware, etc., that provides the functions of authorization mechanism 630. Memory 706 is a computer readable storage medium (e.g., ROM or flash memory) for data, instructions, applications, etc., and is accessible by processor 704. Authorization mechanism 630 may include various other components not specifically illustrated in FIG. 7.

Processor 704 implements a rules engine 710 and a validation controller 712. Rules engine 710 is configured to generate, identify, or determine validation rules 714 that are used to determine whether an application is authorized for direct discovery. Validation controller 712 is configured to determine whether an application is authorized for direct discovery based on validation rules 714. Processor 704 may implement other components for authorizing an application for direct discovery.

In this embodiment, memory 706 is configured to store a database 720 provisioned with security parameters that are mapped to Application IDs. Database 720 may comprise a local database for authorization mechanism 630, or may comprise a network database that is accessible by authorization mechanism 630, such as through interface component 702. FIG. 8 illustrates database 720 in an illustrative embodiment. Database 720 stores records 801-803 for Application IDs 811-813, although records for more Application IDs may also be stored. Each record 801-803 maps an Application ID 811-813 to a set of one or more security parameters 820. A security parameter comprises a characteristic or property that verifies or authenticates a UE or an application. Security parameters 820 include one or more values (e.g., codes, labels, quantities, etc.) that are authorized for its associated Application ID 811-813. For example, record 801 is provisioned for Application ID 811, where Application ID 811 is mapped to security parameters 820. Security parameters 820 include a UE Identity, network address(es), PLMN code(s), location code(s), passcode(s), UE category type, and discovery type, although other security parameters may be included. Each security parameter includes one or more authorized values that are provisioned for Application ID 811. For example, the UE Identity parameter includes one or more values indicating approved UE Identities (or ranges) for Application ID 811, such as one or more IMSIs. The network address parameter includes one or more values indicating approved network address(es) for Application ID 811, such as one or more transport layer (e.g., IP) addresses. The PLMN code parameter includes one or more values indicating approved PLMN code(s) for Application ID 811. The location code parameter includes one or more values indicating approved location code(s) for Application ID 811. The passcode parameter includes one or more values indicating approved passcode(s) or password(s) for Application ID 811 used to access an application. The UE category type parameter includes one or more values indicating approved UE category types for Application ID 811, such as CAT1-CAT8, LTE Cat-M1 (eMTC), Cat-NB1 (NB-IoT), etc. The discovery type parameter includes one or more values indicating approved discovery types for Application ID 811, such as Model A (open or restricted), announce role for Model A, monitor role for Model A, Model B, Model B discovery type/mode, etc. Additional security parameters and associated values may be provisioned as desired.

In FIG. 6, UE 620 may perform a service pre-configuration procedure as shown in FIG. 2, and a service authorization procedure as shown in FIG. 3. At this point, application 622 in UE 620 may want to initiate a discovery request procedure. Thus, application 622 sends a discovery request to ProSe function 612 (see FIGS. 4-5). The discovery request may include similar information as described above, such as a ProSe Application ID, UE Identity, command, Application ID, Discovery Entry ID, [Requested Timer], [Application Level Container], and [PC5 tech]. Authorization mechanism 630 then performs a discovery authorization procedure as described in further detail in FIG. 9.

Figure 9:
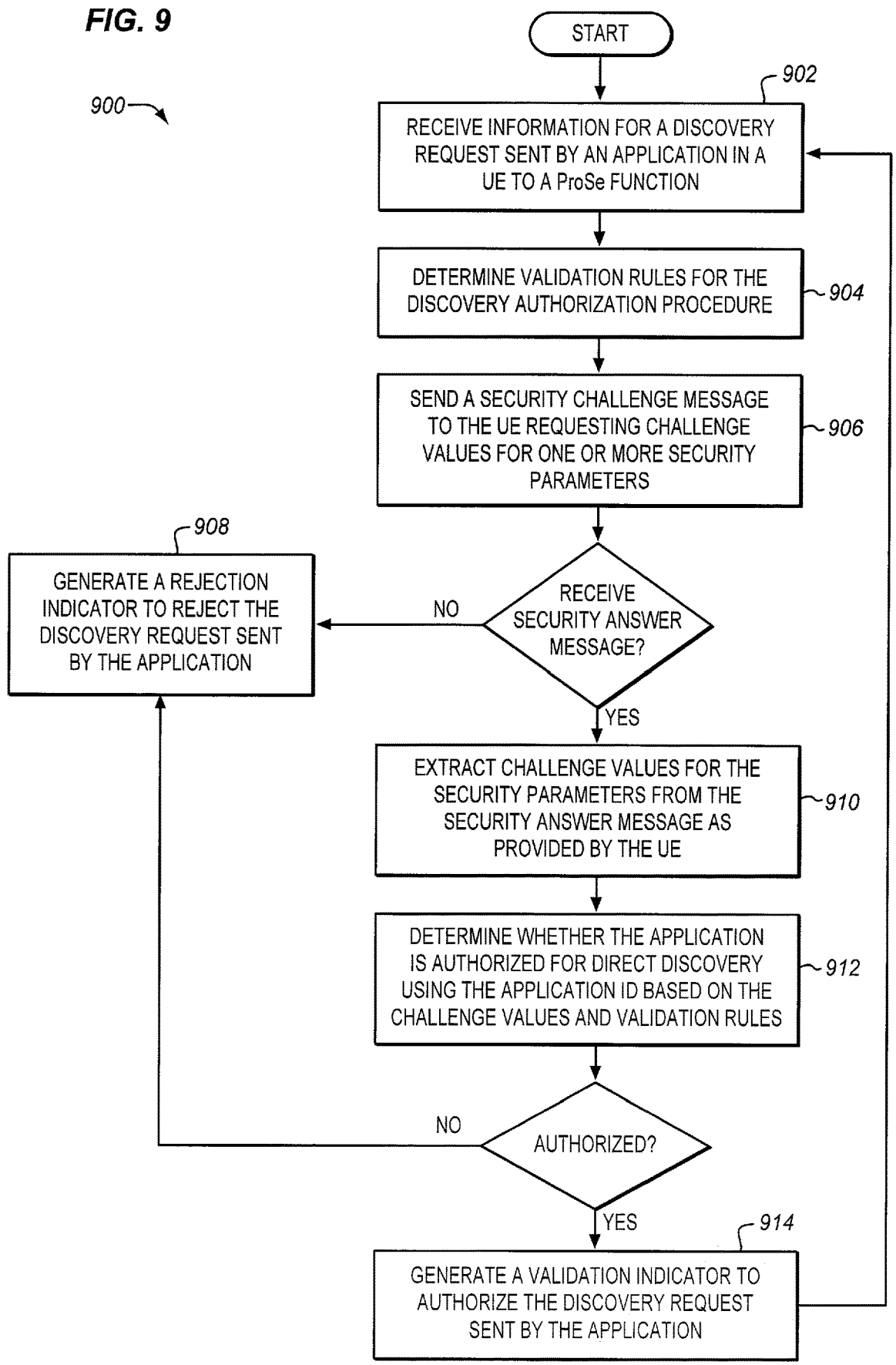
FIG. 9 is a flow chart illustrating a method of performing a discovery authorization procedure in an illustrative embodiment.

FIG. 9 is a flow chart illustrating a method 900 of performing a discovery authorization procedure in an illustrative embodiment. The steps of method 900 will be described with reference to authorization mechanism 630 in FIG. 7, but those skilled in the art will appreciate that method 900 may be performed in other devices. The steps of the flow charts described herein are not all inclusive and may include other steps not shown, and the steps may be performed in an alternative order.

Validation controller 712 receives information for the discovery request sent by application 622 in UE 620 to ProSe function 612 (step 902), such as through interface component 702. If authorization mechanism 630 is implemented in ProSe function 612, then validation controller 712 may receive the actual discovery request that was sent by application 622. If authorization mechanism 630 is a standalone element or is implemented in ProSe Application Server 614, then validation controller 712 may receive the information for the discovery request from ProSe function 612, such as in an authorization request. The information for the discovery request at least includes an Application ID for application 622.

Rules engine 710 determines validation rules 714 for the discovery authorization procedure (step 904). Validation rules 714 comprise any rules that validate an application on a UE that initiates a discovery request. Validation rules 714 may include a network address check. This rule may compare a dynamic network address (e.g., IP address) assigned to a UE with a range of network addresses that are approved (whitelist) or not approved (black list) for an Application ID. Validation rules 714 may include a PLMN code check, which verifies whether direct discovery by the application is allowed in the PLMN (which a UE is attached). Validation rules 714 may include an application passcode check, which verifies whether a passcode (or password) provided by an application/UE matches an approved passcode for the application. Validation rules 714 may include a network (PLMN) sensitivity check. This rule verifies whether an Application ID from an announcing UE belongs to a secure network (home or foreign), as some networks may be restricted from direct discovery for an application. Validation rules 714 may include a network traffic volume check. This rule determines whether traffic volume associated with an Application ID (i.e., either or both of a specific transmitter and transceiver entity address) exceeds a threshold, as a malicious application may generate significant traffic volume. If the threshold is exceeded, then a discovery request may be denied for the application. If traffic volume is below the threshold, then the discovery request may be authorized. Validation rules 714 may include a UE category type check, which verifies whether a UE category type, such as CAT1-CAT8, LTE Cat-M1 (eMTC), Cat-NB1 (NB-IoT), etc., is allowed for an application. Validation rules 714 may include a ProSe discovery type check, which verifies whether an application is authorized for a particular discovery type, such as Model A (open or restricted), announce role for Model A, monitor role for Model A, Model B, Model B discovery type/mode, etc. Validation rules 714 may include a UE location check, which verifies whether a location code for a UE matches an approved location code for an Application ID. Validation rules 714 may include a time check, which verifies whether a discovery request is allowed based on a Time of Day, Day of Week, etc. Other validation rules 714 may be defined as desired.

For the discovery authorization procedure, validation controller 712 sends a security challenge message to UE 620 requesting challenge values for one or more security parameters that are mapped to the Application ID (step 906), such as through interface component 702. UE 620 may store information that may be used for security purposes, and the security challenge message may request that UE 620 responds with this information. The security challenge message is a separate message that is sent to UE 620 after application 622 sends the discovery request to ProSe function 612. The security challenge message may request challenge values for one or more of the security parameters mapped to an Application ID as shown in FIG. 8. For example, the security challenge message may request challenge values for a network address that is statically or dynamically assigned to UE 620, a PLMN code for the HPLMN for UE 620 or a visited/local PLMN where UE 620 is attached, a location code for UE 620, a passcode used to access application 622, a UE category type for UE 620, etc.

If validation controller 712 does not receive a security answer message from UE 620, then validation controller 712 generates a rejection indicator to reject the discovery request sent by application 622 (step 908). If validation controller 712 receives a security answer message from UE 620, such as through interface component 702, then validation controller 712 extracts the challenge values for the security parameters from the security answer message as provided by UE 620 (step 910). Validation controller 712 may also acquire values for some of the security parameters from the discovery request, from HSS 616, or other network entities. Validation controller 712 then determines whether application 622 is authorized for direct discovery using the Application ID based on the challenge values (and optionally other values) for the security parameters and validation rules 714 (step 912). One way of determining whether application 622 is authorized (e.g., step 912 of method 900) is provided in FIG. 10.

Figure 10:
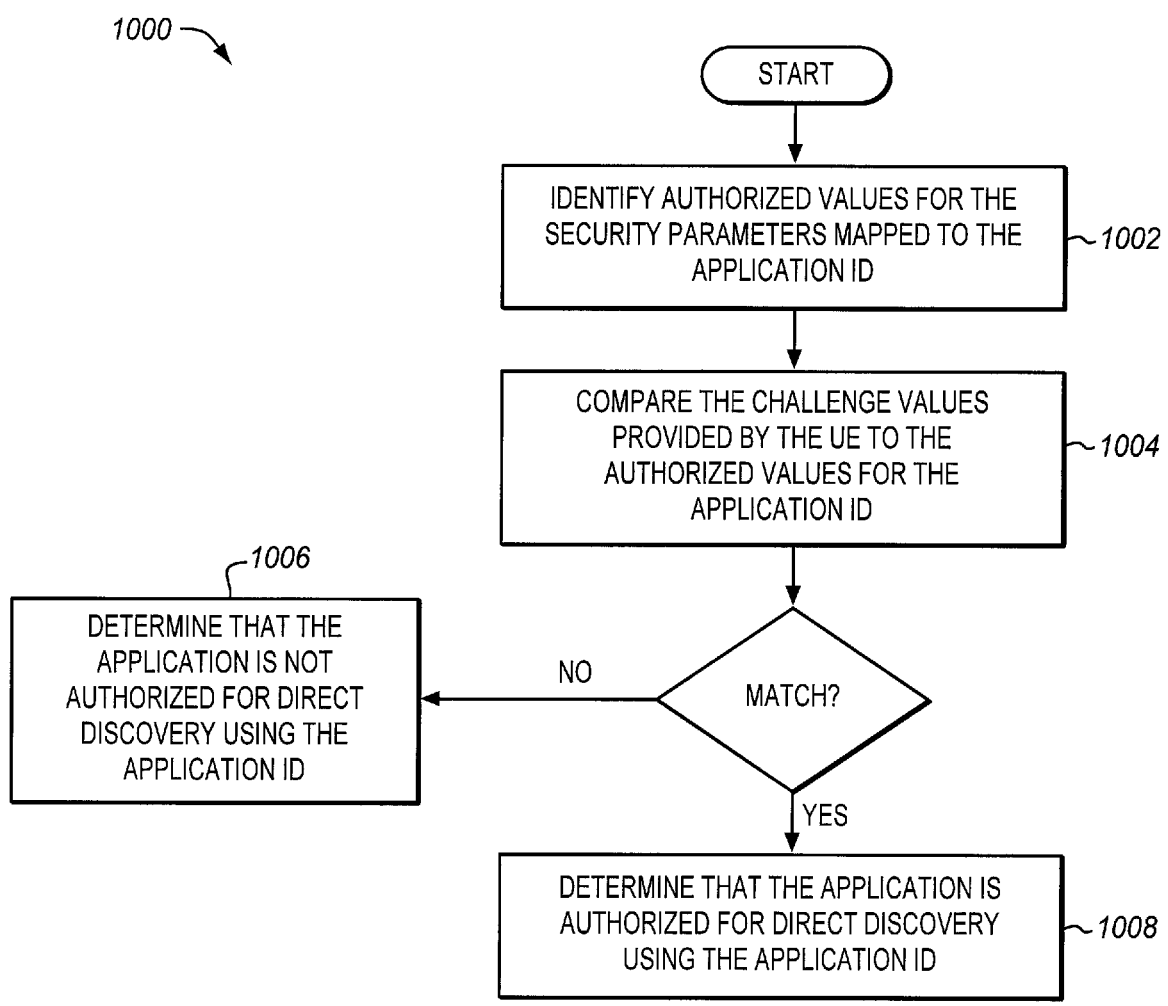
FIG. 10 is a flow chart illustrating a method of determining whether an application is authorized for direct discovery in an illustrative embodiment.

FIG. 10 is a flow chart illustrating a method 1000 of determining whether application 622 is authorized for direct discovery in an illustrative embodiment. Validation controller 712 accesses database 720 to identify the authorized values for the security parameters mapped to the Application ID (step 1002). Validation controller 712 then compares the challenge values provided by UE 620 to the authorized values for the Application ID to determine whether application 622 is authorized for direct discovery using the Application ID (step 1004). For instance, when none of the challenge values provided by UE 620 match the authorized values for the Application ID, validation controller 712 determines that application 622 is not authorized for direct discovery using the Application ID (step 1006). When one or more of the challenge values provided by UE 620 match the authorized values for the Application ID, validation controller 712 may determine that application 622 is authorized for direct discovery using the Application ID (step 1008). The number of matches between the challenge values and authorized values required to authorize application 622 may depend on a network policy provisioned by the network operator.

As an example of method 1000, one of validation rules 714 may be a network address check, where validation controller 712 compares a network address provided by UE 620 in the security answer message with one or more approved network addresses for the Application ID. If the network address provided by UE 620 in the security answer message does not match an approved network address for the Application ID, then validation controller 712 may determine that application 622 is not authorized for direct discovery using the Application ID. If the network address provided by UE 620 in the security answer message matches an approved network address for the Application ID, then validation controller 712 may determine that application 622 is authorized for direct discovery using the Application ID, depending on other validation rules 714 (if applicable).

Another one of validation rules 714 may be a passcode check, where validation controller 712 compares a passcode provided by UE 620 in the security answer message with one or more approved passcodes for the Application ID. If the passcode provided by UE 620 in the security answer message does not match an approved passcode for the Application ID, then validation controller 712 may determine that application 622 is not authorized for direct discovery using the Application ID. If the passcode provided by UE 620 in the security answer message matches an approved passcode for the Application ID, then validation controller 712 may determine that application 622 is authorized for direct discovery using the Application ID, depending on other validation rules 714 (if applicable).

Another one of validation rules 714 may be a location code check, where validation controller 712 compares a location code provided by UE 620 in the security answer message with one or more approved location codes for the Application ID. If the location code provided by UE 620 in the security answer message does not match an approved location code for the Application ID, then validation controller 712 may determine that application 622 is not authorized for direct discovery using the Application ID. For instance, if an Application ID is associated with a Brazil country code but UE 620 provides a location code in the United States, then validation controller 712 determines that application 622 is not authorized for direct discovery using the Application ID. If the location code provided by UE 620 in the security answer message matches an approved location code for the Application ID, then validation controller 712 may determine that application 622 is authorized for direct discovery using the Application ID, depending on other validation rules 714 (if applicable).

When application 622 is not authorized for direct discovery using the Application ID, validation controller 712 generates a rejection indicator to reject the discovery request sent by application 622 (step 908). Validation controller 712 may provide the rejection indicator to ProSe function 612, such as through interface component 702, which may then reject the discovery request by sending a discovery response with information indicating that the discovery request has been rejected. If application 622 is authorized for direct discovery using the Application ID, then validation controller 712 generates a validation indicator to authorize the discovery request sent by application 622 (step 914). Validation controller 712 may provide the validation indicator to ProSe function 612, such as through interface component 702. When application 622 is authorized by validation controller 712, ProSe function 612 may continue with the discovery request procedure, and send a discovery response to UE 620 as indicated in FIGS. 4-5, or may perform further authorization procedures (e.g., query HSS 616). The discovery response may include an Application Code (for announcing), Discovery Filter(s) for monitoring, or other information that allows UE 620/application 622 to preform direct discovery using the Application ID.

Authorization mechanism 630 provides an additional level of validation of an Application ID in response to a discovery request. One technical benefit is that it is more difficult for an application to spoof an Application ID and be granted permission for a discovery procedure by a ProSe function. Thus, proximity services in a network will be utilized by authorized applications, while malicious applications will be blocked.

Figure 11:
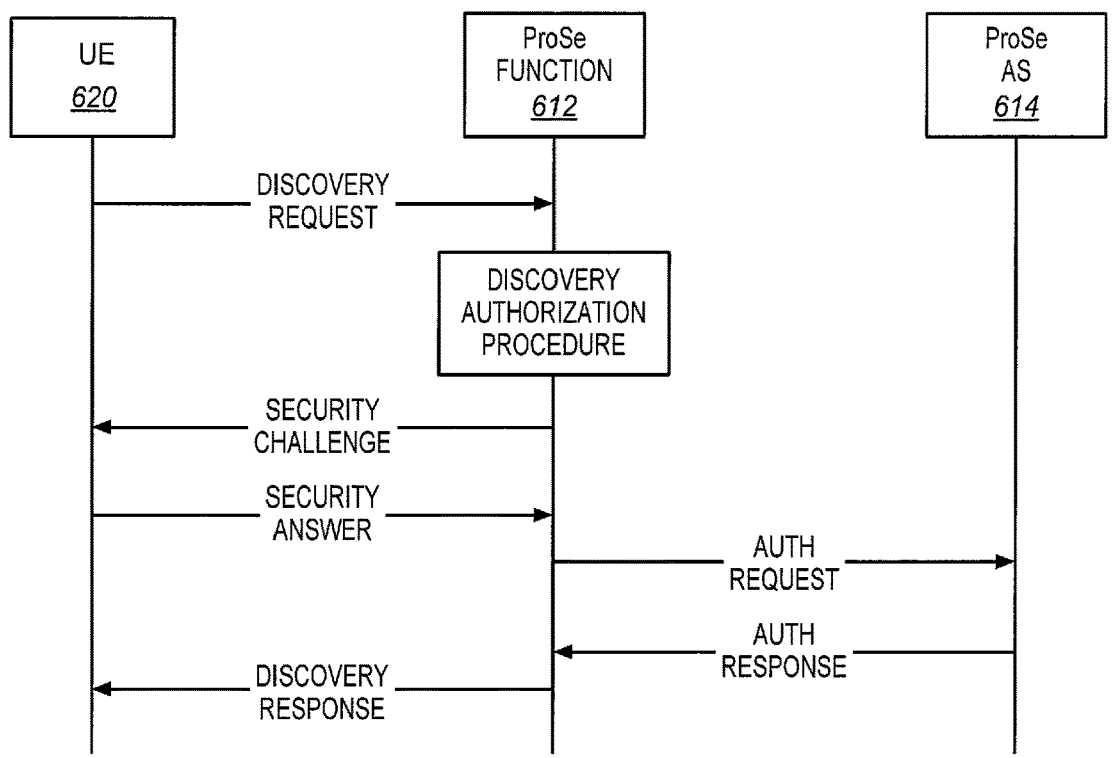
FIG. 11 is a flow diagram when an authorization mechanism is implemented in a ProSe function in an illustrative embodiment.

As described above, authorization mechanism 630 may be implemented in ProSe function 612. FIG. 11 is a flow diagram when authorization mechanism 630 is implemented in ProSe function 612 in an illustrative embodiment. UE 620 (through application 622) sends a discovery request to ProSe function 612. The discovery request includes the ProSe Application ID, UE Identity, command type (announcing, monitoring, etc.), Discovery Entry ID, Application ID, etc. ProSe function 612 (through authorization mechanism 630) then initiates a discovery authorization procedure. ProSe function 612 sends a security challenge message to UE 620 requesting challenge values for one or more security parameters. ProSe function 612 receives a security answer message from UE 620, and extracts the challenge values for the security parameters from the security answer message as provided by UE 620. ProSe function 612 then determines whether application 622 is authorized for direct discovery using the Application ID based on the challenge values (and optionally other values) for the security parameters and validation rules 714. If application 622 is not authorized for direct discovery using the Application ID, then ProSe function 612 rejects the discovery request sent by application 622. If application 622 is authorized for direct discovery using the Application ID, then ProSe function 612 sends a discovery response to UE 620 with information for direct discovery (e.g., Application Code, Discovery Filter, etc.). ProSe Function 612 may also include one or more security parameters (and approved values) associated with the approved Application ID, in the ProSe Application Code Suffix pool (and may be reflected in the Application Code/Mask) of the discovery response.

Figure 12:
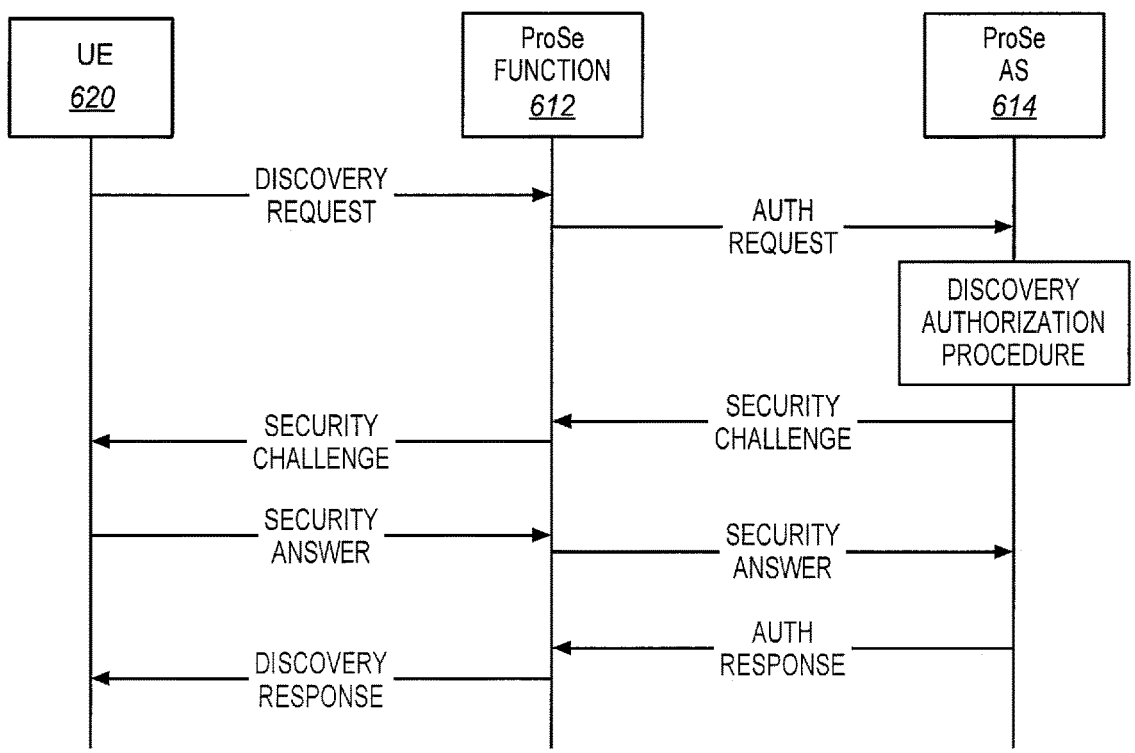
FIG. 12 is a flow diagram when an authorization mechanism is implemented in a ProSe Application Server in an illustrative embodiment.

FIG. 12 is a flow diagram when authorization mechanism 630 is implemented in ProSe Application Server 614 in an illustrative embodiment. UE 620 (through application 622) sends a discovery request to ProSe function 612. The discovery request includes the ProSe Application ID, UE Identity, command type (announcing, monitoring, etc.), Discovery Entry ID, Application ID, etc. Based on network policy, ProSe function 612 requests that ProSe Application Server 614 validate the Application ID in response to the discovery request. Thus, ProSe function 612 sends an authorization request to ProSe Application Server 614. ProSe function 612 includes the Application ID for application 622 and associated parameters in the Application Level Container to ProSe Application Server 614. ProSe Application Server 614 (through authorization mechanism 630) then initiates a discovery authorization procedure. ProSe Application Server 614 sends a security challenge message to ProSe function 612, which forwards the security challenge message to UE 620 requesting challenge values for one or more security parameters. ProSe Application Server 614 may alternatively send the security challenge message directly to UE 620. ProSe function 612 receives a security answer message from UE 620, and forwards the security answer message to ProSe Application Server 614. ProSe Application Server 614 extracts the challenge values for the security parameters from the security answer message as provided by UE 620. ProSe Application Server 614 then determines whether application 622 is authorized for direct discovery using the Application ID based on the challenge values (and optionally other values) for the security parameters and validation rules 714. If application 622 is not authorized for direct discovery using the Application ID, then ProSe Application Server 614 sends an authorization response to ProSe function 612 with a rejection indicator to reject the discovery request sent by application 622. If application 622 is authorized for direct discovery using the Application ID, then ProSe Application Server 614 sends an authorization response to ProSe function 612 with a validation indicator to authorize the discovery request sent by application 622. ProSe function 612 then sends a discovery response to UE 620 based on the validation/rejection indicator. ProSe Function 612 may also include one or more security parameters (and approved values) associated with the approved Application ID, in the ProSe Application Code Suffix pool (and may be reflected in the Application Code/Mask) of the discovery response.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

What is claimed is:
1. A system comprising:
an authorization mechanism that performs a discovery authorization procedure for proximity services (ProSe), the authorization mechanism comprising:

a validation controller configured to receive information for a discovery request sent by an application in User Equipment (UE) to a ProSe function, wherein the discovery request includes an application identifier (ID) for the application; and a rules engine configured to determine validation rules for the discovery authorization procedure;

the validation controller is configured to send a security challenge message to the UE prior to the ProSe function sending a discovery response to the UE, the security challenge message requesting challenge values for security parameters that are mapped to the application ID;

the validation controller is configured to receive a security answer message from the UE in response to the security challenge message, to extract the challenge values for the security parameters from the security answer message as provided by the UE, and to determine whether the application is authorized for direct discovery using the application ID based on the challenge values for the security parameters and the validation rules;

the validation controller is configured to generate a validation indicator to authorize the discovery request sent by the application when the application is authorized for direct discovery using the application ID.

2. The system of claim 1 wherein:
the validation controller is configured to generate a rejection indicator to reject the discovery request sent by the application when the application is not authorized for direct discovery using the application ID.

3. The system of claim 1 wherein the authorization mechanism further comprises:
a database that maps the security parameters to the application ID;
wherein the security parameters mapped to the application ID include authorized values provisioned for the application ID.

4. The system of claim 3 wherein:
the validation controller is configured to identify the authorized values for the security parameters mapped to the application ID, and to compare the challenge values provided by the UE to the authorized values provisioned for the application ID to determine whether the application is authorized for direct discovery using the application ID.

5. The system of claim 1 wherein:
the validation controller is configured to send the security challenge message to the UE requesting a network address assigned to the UE.

6. The system of claim 1 wherein:
the validation controller is configured to send the security challenge message to the UE requesting a Public Land Mobile Network (PLMN) code.

7. The system of claim 1 wherein:
the validation controller is configured to send the security challenge message to the UE requesting a location code for the UE.

8. The system of claim 1 wherein:
the validation controller is configured to send the security challenge message to the UE requesting a passcode used to access the application.

9. The system of claim 1 wherein:
the authorization mechanism is implemented in the ProSe function that receives the discovery request from the UE.

10. The system of claim 1 wherein:
the authorization mechanism is implemented in a ProSe Application Server that is communicatively coupled to the ProSe function that receives the discovery request from the UE.

11. A method of performing a discovery authorization procedure for proximity services (ProSe), the method comprising:
receiving, in an authorization mechanism, information for a discovery request sent by an application in User Equipment (UE) to a ProSe function, wherein the discovery request includes an application identifier (ID) for the application;
determining, at the authorization mechanism, validation rules for the discovery authorization procedure;
sending a security challenge message from the authorization mechanism to the UE prior to the ProSe function sending a discovery response to the UE, the security challenge message requesting challenge values for security parameters that are mapped to the application ID;
receiving a security answer message at the authorization mechanism from the UE in response to the security challenge message;
extracting, at the authorization mechanism, the challenge values for the security parameters from the security answer message as provided by the UE;
determining whether the application is authorized for direct discovery using the application ID based on the challenge values for the security parameters and the validation rules; and
generating a validation indicator to authorize the discovery request sent by the application when the application is authorized for direct discovery using the application ID.

12. The method of claim 11 further comprising:
generating a rejection indicator to reject the discovery request sent by the application when the application is not authorized for direct discovery using the application ID.

13. The method of claim 11 further comprising:
storing a database that maps the security parameters to the application ID;
wherein the security parameters mapped to the application ID include authorized values provisioned for the application ID.

14. The method of claim 13 wherein determining whether the application is authorized for direct discovery comprises:
identifying the authorized values for the security parameters mapped to the application ID; and
comparing the challenge values provided by the UE to the authorized values provisioned for the application ID to determine whether the application is authorized for direct discovery using the application ID.

15. A non-transitory computer readable medium embodying programmed instructions executed by one or more processors, wherein the instructions direct the processors to implement:
an authorization mechanism that performs a discovery authorization procedure for proximity services (ProSe);
the authorization mechanism is configured to receive information for a discovery request sent by an application in User Equipment (UE) to a ProSe function, wherein the discovery request includes an application identifier (ID) for the application;

the authorization mechanism is configured to determine validation rules for the discovery authorization procedure;

the authorization mechanism is configured to send a security challenge message to the UE prior to the ProSe function sending a discovery response to the UE, the security challenge message requesting challenge values for security parameters that are mapped to the application ID;

the authorization mechanism is configured to receive a security answer message from the UE in response to the security challenge message, to extract the challenge values for the security parameters from the security answer message as provided by the UE, and to determine whether the application is authorized for direct discovery using the application ID based on the challenge values for the security parameters and the validation rules; and the authorization mechanism is configured to generate a validation indicator to authorize the discovery request sent by the application when the application is authorized for direct discovery using the application ID.

16. The computer readable medium of claim 15 wherein:
the authorization mechanism is configured to generate a rejection indicator to reject the discovery request sent by the application when the application is not authorized for direct discovery using the application ID.

17. The computer readable medium of claim 15 wherein:
the authorization mechanism is configured to store a database that maps the security parameters to the application ID; and the security parameters mapped to the application ID include authorized values provisioned for the application ID.

18. The computer readable medium of claim 17 wherein:
the authorization mechanism is configured to identify the authorized values for the security parameters mapped to the application ID, and to compare the challenge values provided by the UE to the authorized values provisioned for the application ID to determine whether the application is authorized for direct discovery using the application ID.

19. The computer readable medium of claim 15 wherein:
the authorization mechanism is implemented in the ProSe function that receives the discovery request from the UE.

20. The computer readable medium of claim 15 wherein:
the authorization mechanism is implemented in a ProSe Application Server that is communicatively coupled to the ProSe function that receives the discovery request from the UE.

* * * * *